Jan. 26, 1932.  C. W. SPOHR  1,842,430
FUEL FEED SYSTEM FOR MOTOR VEHICLES
Filed Aug. 1, 1928
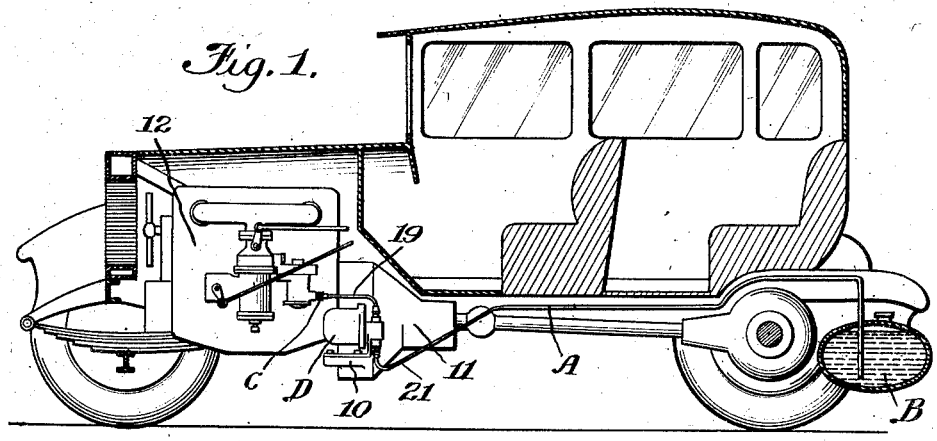
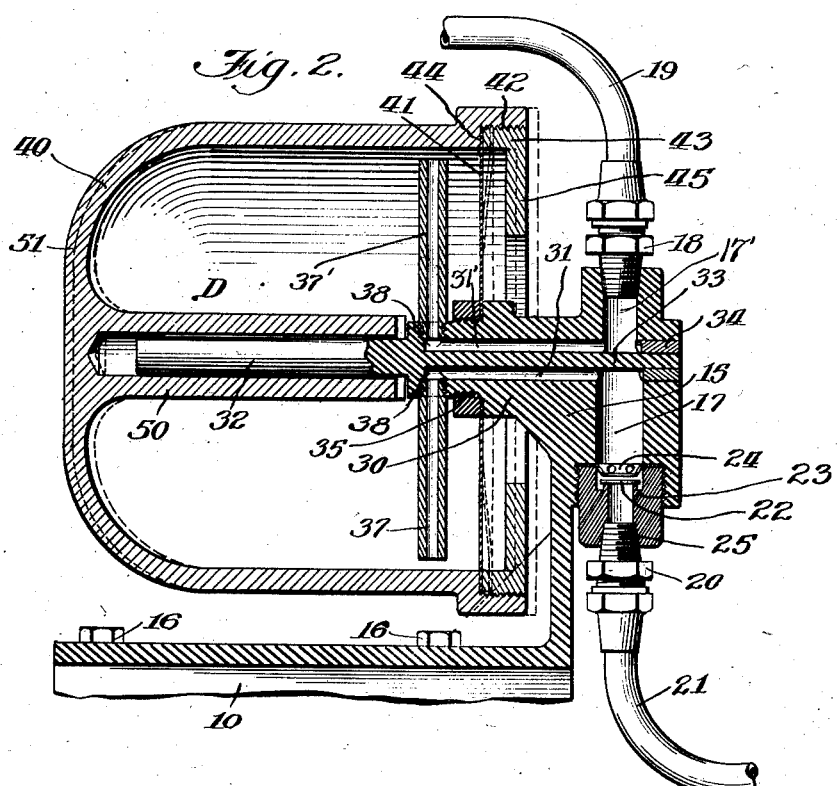
Inventor,
Carl W. Spohr
By Williams, Bradbury,
McCaleb & Hinkle  Attys.

Patented Jan. 26, 1932

1,842,430

UNITED STATES PATENT OFFICE

CARL W. SPOHR, OF CHICAGO, ILLINOIS, ASSIGNOR TO CURTIS B. CAMP, TRUSTEE, OF GLENCOE, ILLINOIS

FUEL FEED SYSTEM FOR MOTOR VEHICLES

Application filed August 1, 1928. Serial No. 296,660.

My invention relates to improvements in fuel feed systems for motor vehicles.

I have illustrated my improved fuel feed system as used in connection with a carburetor of the vacuum feed type, such as shown in my co-pending application for patent on carburetor, bearing Serial No. 141,448, and filed October 14, 1926. This type of carburetor is connected directly to the main fuel supply tank B, affording an uninterrupted fuel passage between the tank B and the fuel nozzle of the carburetor. My present invention, however, is equally well suited for use in connection with any type of fuel system wherein the fuel is conducted directly to the nozzle of the carburetor through a normally uninterrupted passage.

An object of the invention is to provide an improved fuel feed system for motor vehicles.

Another object is to provide a fuel feed system for motor vehicles which affords smooth acceleration of the motor vehicle either from a standstill or upon an increase in the speed of the vehicle.

Another object is to provide a fuel feed system wherein erratic carburetor operation due to back suction created in the fuel feed passage to the carburetor by inertia of fuel therein upon sudden forward movement of the vehicle, is entirely precluded.

A further object is to provide a fuel feed system wherein the sudden forward movement of the vehicle, as during acceleration in speed, causes a slightly increased flow of fuel to the carburetor, thereby supplying ample fuel to the carburetor at the time when the fuel demand is at its maximum.

Another object is to provide a fuel feed system for motor vehicles which is particularly well adapted for use with motor vehicles in which an uninterrupted and forwardly extending fuel passage is employed to conduct fuel from a fuel tank at the rear of the carburetor directly to the fuel nozzle thereof.

Another object is to provide a fuel feed system for motor vehicles in which the fuel feed passage interconnecting the source of fuel supply and the carburetor is automatically closed at a point near the carburetor upon sudden acceleration of the vehicle and in which the fuel between the point of passage closure and the carburetor is urged toward the carburetor.

Other objects and advantages will hereinafter appear.

An embodiment of my improved fuel feed system for motor vehicles is illustrated in the accompanying drawings, in which Fig. 1 is a vertical sectional view through a motor vehicle embodying my improved fuel feed system; and Fig. 2 is a vertical sectional view through a part of the mechanism illustrated in Fig. 1.

In general, my improved fuel feed system comprises a normally uninterrupted fuel supply passage A interconnecting the main fuel supply tank B of a motor vehicle and the carburetor fuel inlet C, and a device D forming a part of the passage A, automatically operable upon sudden forward movement of the vehicle to close passage A and exert pressure upon fluid in the passage between the device and the carburetor.

The device D comprises a body 15 secured by bolts 16 to a bracket 10 which may be formed integral with the transmission housing 11 of the motor vehicle engine 12. The body 15 has a pair of aligned passages 17 and 17' therein separated at their inner ends by a thin wall 33. Passage 17' is connected at 18 to that section 19 of passage A connected to the fuel inlet port C of the carburetor and the passage 17 is connected at 20 to that section 21 of the fuel passage which is connected to the main fuel supply tank B.

A check valve comprising a valve disc 22 and a valve seat 23 is disposed at the lower end of passage 17. Disc 22 is confined against excessive movement away from seat 23 by a guard 24 having its edges lying between the adjacent face of body 15 and a screw threaded plug 25 in which valve seat 23 is formed. The tube connection 20 is received within an internally threaded part of plug 25.

The body 15 is further formed with a neck 30 extending forwardly toward the front of the vehicle. The neck 30 terminates in an integral elongated spindle 32. The neck 30 has a pair of parallel bores 31 and 31' extending longitudinally therethrough formed by the drilling through the rear wall of the body 15. The drill openings at the rear wall of the body are closed by stokes 34. Bore 31 communicates with passage 17 and bore 31' communicates with bore 17'.

Tubes 37 and 37' are connected with bores 31 and 31' and secured at their inner ends by screwthreaded connection 38 to the neck 30. The tubes 37 and 37' are the same length and diametrically opposed, one extending vertically downward and one vertically upward.

A chamber formed of a housing 40 and a diaphragm 41 surrounds the forward end of the neck 30, tubes 37 and 37' and spindle 32. The housing 40 is substantially cup shaped and has an enlarged internally threaded mouth 42. An externally threaded ring 43 is received in the threaded mouth 42 and the diaphragm 41 is secured at its edges between the ring 43 and a shouldered portion 44 of the mouth. Ring 43 has an inward radial flange 45 which serves as a guard for diaphragm 41.

The housing 40 is further fashioned with a tubular guide member 50 extending rearwardly from the forward end 51 of the chamber and which is loosely fitted over spindle 32.

In operation, the fuel passing from tank B through passage A to the inlet C of the carburetor maintains chamber 40—41 filled with the fuel which enters the chamber through bore 31 and tube 37 from the passage 17 and which must leave the chamber through tube 37', bore 31' and passage 17'. By withdrawing fuel from chamber 40 with tube 37' having its orifice at the top of the chamber, I prevent the accumulation of air in the chamber which would result in the improper functioning of the device.

Upon sudden forward movement of the vehicle, as in the starting or upon acceleration in speed, the inertia of the housing 40 resists movement of the housing with the vehicle and diaphragm 41 assumes that position relative to the stationary body 15 of device D shown in the dotted lines of Fig. 2. This relative movement between the housing and the body 15 causes a displacement of fuel in the chamber equal to the distance between the full and dotted line position of the diaphragm 41 and the displacement of fuel from the chamber in the manner described serves to close valve 22 and exert a slight positive pressure in that section of passage A comprising the tube 19 and the several fuel conducting passages of the device.

My improved fuel feed system therefore provides an actual forward movement of the fuel toward the carburetor nozzle upon sudden forward movement or acceleration of the vehicle at a time when the carburetor fuel demand is at its maximum. In vehicles not so equipped the inertia of fuel in the relatively long passage A is sufficient to create a back suction in the fuel passage so as to momentarily deprive the carburetor of fuel under these conditions, which results in erratic carburetor performance.

The back suction of fuel in section 21 of passage A aids in the closing of valve 22 so that the valve is immediately closed to prevent the communication of back suction in section 21 to the carburetor upon any appreciable and sudden forward movement of the vehicle or upon acceleration.

The spindle 32 functions as a guide for housing 40 and therefore relieves the diaphragm 41 of excessive strain.

The degree of movement of housing 40 is proportional to the increased speed of the vehicle and therefore very slight increases in the speed will not appreciably increase the momentary flow of fuel to the carburetor and conversely material or relatively great increase of speed of the vehicle will in addition to preventing the creating of back suction of the fuel nozzle cause a marked or relatively great increase in the amount of fuel delivered to the carburetor.

What I claim is new and desire United States Letters Patent for is as follows:

1. In a fuel feed system for motor vehicles having a normally uninterrupted fuel passage extending from the carburetor toward the rear of the vehicle, a chamber forming a part of said passage and movable relative to the vehicle and means actuated by movement of the chamber for building up a slight positive pressure in the fuel in said chamber and in the passage between said chamber and the carburetor upon sudden or increased forward movement of the vehicle.

2. In a fuel feed system for motor vehicles having a normally uninterrupted fuel passage extending from the carburetor toward the rear of the vehicle, a chamber forming a part of said passage and means for building up a slight positive pressure in the fuel in said chamber and in the passage between said chamber and the carburetor upon sudden or increased forward movement of the vehicle, said means including a flexible diaphragm forming a part of the chamber walls and having a point fixed with respect to the vehicle chassis.

3. In combination with a motor vehicle having a carburetor, a fuel passage extending from the carburetor toward the rear of the vehicle, a fuel chamber forming a part of said passage, said chamber being movable along the longitudinal axis of the vehicle and having a flexible diaphragm forming a part of the chamber walls fixed at one point against movement with respect to the vehicle, and a check valve in said fuel passage immediately to the rear of said chamber.

4. In a fuel feed system for motor vehicles wherein the fuel is drawn directly to the carburetor from a supply tank at the rear of the carburetor through a normally uninterrupted passage, a chamber forming a part of said passage movable along the longitudinal axis of the vehicle and flexible means forming a wall of the chamber effective upon relative movement between the chamber and the vehicle to actuate means in said passage anterior of said chamber for closing said passage.

5. In a fuel feed system for motor vehicles wherein the fuel is drawn directly to the carburetor from a supply tank at the rear of the carburetor through a normally uninterrupted passage, a chamber forming a part of said passage movable along the longitudinal axis of the vehicle and means associated with the chamber for closing the passage upon relative movement between the chamber and the vehicle and for creating slight positive pressure in the fuel passage between the chamber and the carburetor.

6. In a fuel feed system for motor vehicles having a normally uninterrupted fuel passage extending from the carburetor toward the rear of the vehicle, a chamber forming a part of said passage and having limited unrestrained movement relative to the vehicle and means for building up a slight positive pressure in the fuel in said chamber and in the passage between said chamber and the carburetor upon sudden or increased forward movement of the vehicle, said means including a flexible diaphragm forming a part of the chamber walls and having a point fixed with respect to the vehicle chassis.

7. In combination with a motor vehicle having a carburetor, a fuel passage extending from the carburetor toward the rear of the vehicle, a fuel chamber forming a part of said passage, said chamber being relatively freely movable along the longitudinal axis of the vehicle upon sudden or increased forward movement of the vehicle and having a flexible diaphragm forming a part of the chamber walls fixed at one point against movement with respect to the vehicle, and a check valve in said fuel passage immediately to the rear of said chamber to check back flow of fuel from the chamber and prevent back suction thereon.

8. In a fuel feed system for motor vehicles wherein the fuel is drawn directly to the carburetor from a supply tank at the rear of the carburetor through a normally uninterrupted passage, a chamber forming a part of said passage movable along the longitudinal axis of the vehicle upon sudden or increased forward movement of the vehicle, and flexible means forming a wall of the chamber effective upon relative movement between the chamber and the vehicle to actuate means in said passage anterior of said chamber for closing said passage.

9. In a fuel feed system for motor vehicles wherein the fuel is drawn directly to the carburetor from a supply tank at the rear of the carburetor through a normally uninterrupted passage, a body fixed to the vehicle and having a guide member, a chamber forming a part of said passage and supported on said guide for movement along the longitudinal axis of the vehicle upon sudden or increased forward movement of the same, passages connecting the said chamber respectively with the carburetor and the supply tank, a flexible diaphragm secured to said body and one end of the chamber to form the end wall of the same, and means in said passage anterior of said chamber for closing the passage between the chamber and the supply tank upon relative movement between the chamber and the vehicle for creating a slight positive pressure in the fuel passage between said means and the carburetor.

In witness whereof, I hereunto subscribe my name this 27th day of July, 1928.

CARL W. SPOHR.